(12) United States Patent
Dai et al.

(10) Patent No.: US 12,561,122 B2
(45) Date of Patent: Feb. 24, 2026

(54) SOFTWARE PACKAGE UPDATE HANDLING

(71) Applicant: INTERNATIONAL BUSINESS MACHINES CORPORATION, Armonk, NY (US)

(72) Inventors: Ting Dai, Elmsford, NY (US); Muhammed Fatih Bulut, West Greenwich, RI (US); Shripad Nadgowda, Elsmford, NY (US); Daby Mousse Sow, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 17/656,245

(22) Filed: Mar. 24, 2022

(65) Prior Publication Data

US 2023/0305827 A1 Sep. 28, 2023

(51) Int. Cl.
| | |
|---|---|
| *G06F 8/61* | (2018.01) |
| *G06F 8/41* | (2018.01) |
| *G06F 8/65* | (2018.01) |
| *G06F 8/658* | (2018.01) |
| *G06F 8/70* | (2018.01) |
| *G06F 8/71* | (2018.01) |

(52) U.S. Cl.
CPC ............... *G06F 8/63* (2013.01); *G06F 8/433* (2013.01); *G06F 8/65* (2013.01); *G06F 8/658* (2018.02); *G06F 8/70* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,308,712 B2 | 12/2007 | Banzhof | |
| 9,274,784 B2 * | 3/2016 | Wang | G06F 8/70 |
| 10,394,540 B1 * | 8/2019 | Bentley | G06F 9/44505 |
| 10,691,808 B2 | 6/2020 | Brucker | |
| 10,725,752 B1 * | 7/2020 | Wagner | G06F 16/183 |
| 11,163,889 B2 | 11/2021 | Sloane | |
| 11,586,436 B1 * | 2/2023 | Jennings | G06F 8/61 |

(Continued)

FOREIGN PATENT DOCUMENTS

CN 110287704 A 9/2019

OTHER PUBLICATIONS

Alon et al., "code2vec: Learning Distributed Representations of Code," arXiv:1803.09473v5, Oct. 30, 2018, 30 pages.

(Continued)

*Primary Examiner* — Jason D Mitchell
(74) *Attorney, Agent, or Firm* — Yee & Associates, P.C.

(57) ABSTRACT

A method, system, and computer program product for software package update handling are provided. The method installs an initial set of software packages in a virtual environment. A package dependency graph is generated representing independent software packages and dependent software packages of the initial set of software packages. One or more software packages are updated with one or more updated software packages to generate a subsequent set of software packages. A compatibility check is performed on the subsequent set of software packages. The method generates an update prerequisite package based on the compatibility check.

17 Claims, 6 Drawing Sheets

(56) References Cited

U.S. PATENT DOCUMENTS

| | | | | |
|---|---|---|---|---|
| 11,734,433 | B2 * | 8/2023 | Nagaraja | G06F 11/3684 |
| | | | | 726/25 |
| 2008/0139191 | A1 * | 6/2008 | Melnyk | H04L 67/565 |
| | | | | 707/E17.121 |
| 2008/0320460 | A1 * | 12/2008 | Miller | G06F 9/44536 |
| | | | | 717/162 |
| 2014/0007043 | A1 * | 1/2014 | Aliseychik | G06F 8/70 |
| | | | | 717/106 |
| 2014/0122422 | A1 * | 5/2014 | Tzadikevitch | G06F 16/116 |
| | | | | 707/610 |
| 2017/0003950 | A1 * | 1/2017 | Newell | G06F 8/65 |
| 2017/0131999 | A1 * | 5/2017 | Dolby | G06F 8/61 |
| 2017/0195361 | A1 | 7/2017 | Liu | |
| 2017/0262274 | A1 * | 9/2017 | Vangelov | G06F 8/65 |
| 2017/0315797 | A1 * | 11/2017 | Vangelov | H04L 67/12 |
| 2019/0163463 | A1 | 5/2019 | Bulut | |
| 2020/0074084 | A1 | 3/2020 | Dorrans | |
| 2020/0242254 | A1 | 7/2020 | Velur | |
| 2020/0278855 | A1 * | 9/2020 | Nidugala | G06F 8/65 |
| 2021/0021462 | A1 * | 1/2021 | Chaignon | H04L 41/0897 |
| 2021/0126949 | A1 | 4/2021 | Nadgowda | |
| 2021/0318862 | A1 * | 10/2021 | Subramanian | G06F 8/71 |
| 2021/0397426 | A1 * | 12/2021 | Du | G06F 8/61 |
| 2022/0156053 | A1 * | 5/2022 | Shaastry | G06F 8/71 |
| 2022/0334819 | A1 * | 10/2022 | R | G06F 8/61 |
| 2022/0334820 | A1 * | 10/2022 | R | G06F 9/44505 |

OTHER PUBLICATIONS

Brewer et al., "Know, Prevent, Fix: A framework for shifting the discussion around vulnerabilities in open source," Google Open Source Blog, printed Mar. 22, 2022, 10 pages.

Chinthanet et al., "Lags in the Release, Adoption and Propagation of NPM Vulnerability Fixes," Empirical Software Engineering (2021) 26: 47, Mar. 30, 2021, 12 pages.

"GitHub—renovatebot/renovate", Downloaded form the internet on Mar. 22, 2022, 9 pages, © 2022 GitHub, Inc.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

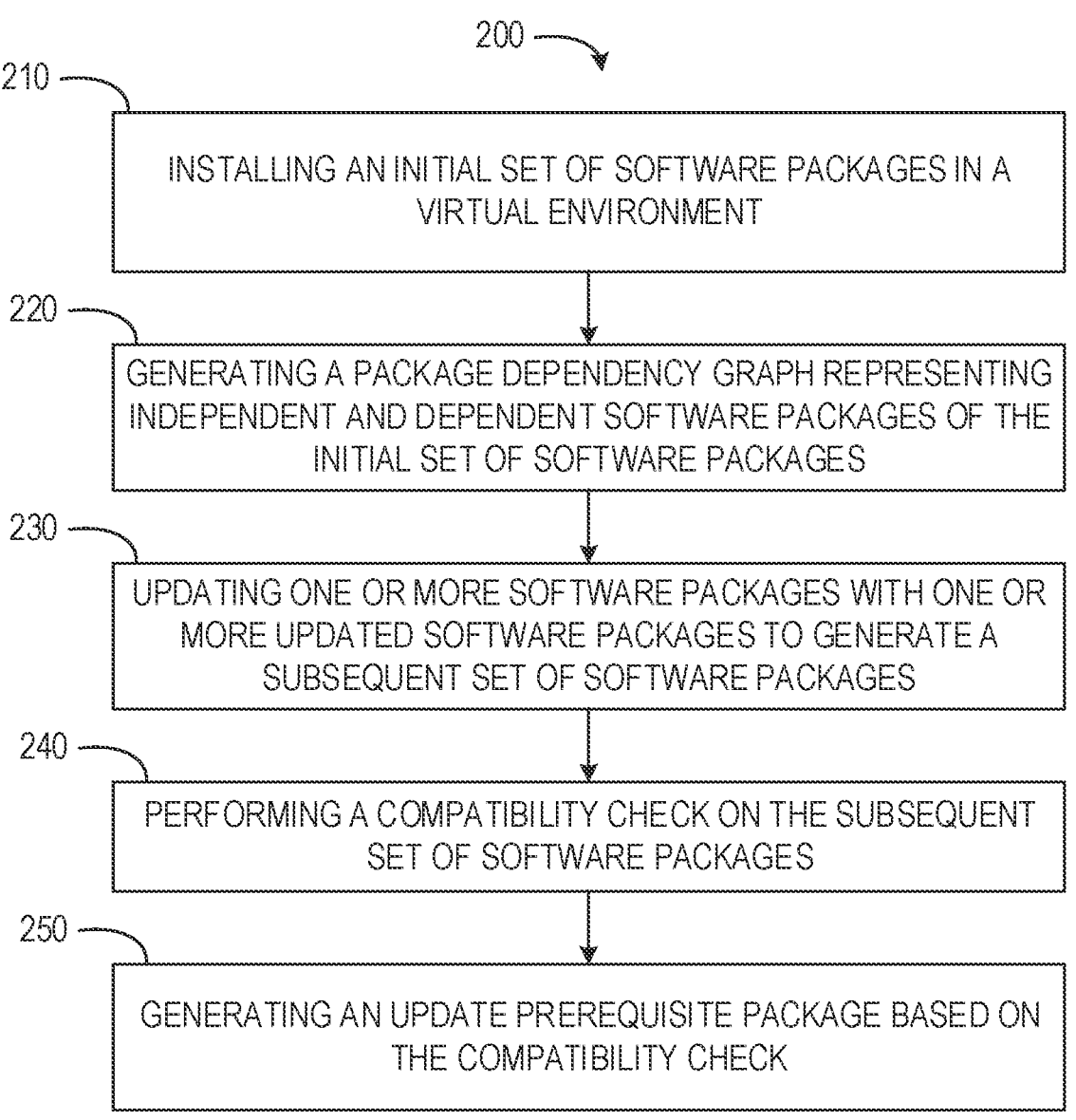

200

210 — INSTALLING AN INITIAL SET OF SOFTWARE PACKAGES IN A VIRTUAL ENVIRONMENT

220 — GENERATING A PACKAGE DEPENDENCY GRAPH REPRESENTING INDEPENDENT AND DEPENDENT SOFTWARE PACKAGES OF THE INITIAL SET OF SOFTWARE PACKAGES

230 — UPDATING ONE OR MORE SOFTWARE PACKAGES WITH ONE OR MORE UPDATED SOFTWARE PACKAGES TO GENERATE A SUBSEQUENT SET OF SOFTWARE PACKAGES

240 — PERFORMING A COMPATIBILITY CHECK ON THE SUBSEQUENT SET OF SOFTWARE PACKAGES

250 — GENERATING AN UPDATE PREREQUISITE PACKAGE BASED ON THE COMPATIBILITY CHECK

FIG. 2

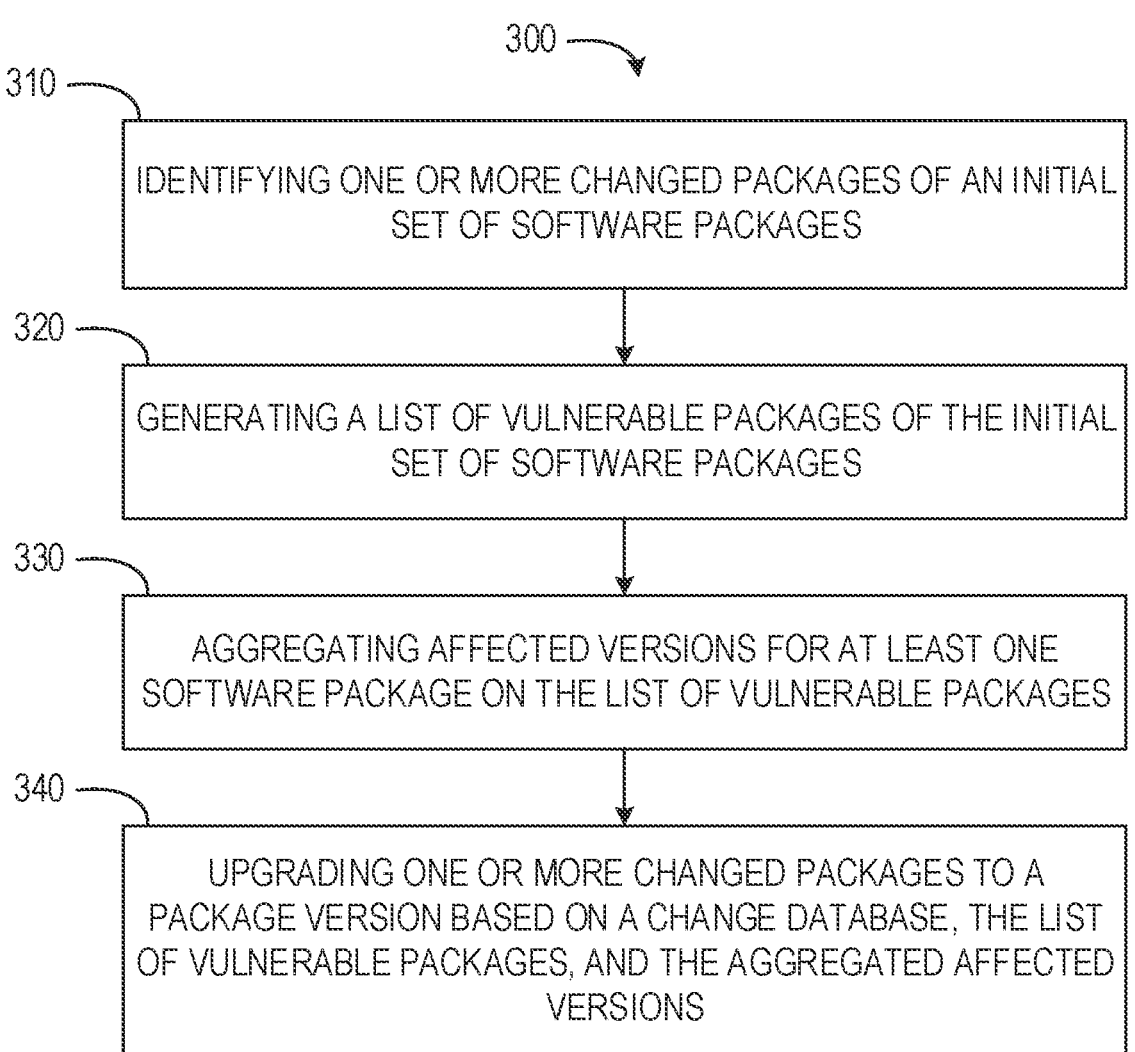

300

310 — IDENTIFYING ONE OR MORE CHANGED PACKAGES OF AN INITIAL SET OF SOFTWARE PACKAGES

320 — GENERATING A LIST OF VULNERABLE PACKAGES OF THE INITIAL SET OF SOFTWARE PACKAGES

330 — AGGREGATING AFFECTED VERSIONS FOR AT LEAST ONE SOFTWARE PACKAGE ON THE LIST OF VULNERABLE PACKAGES

340 — UPGRADING ONE OR MORE CHANGED PACKAGES TO A PACKAGE VERSION BASED ON A CHANGE DATABASE, THE LIST OF VULNERABLE PACKAGES, AND THE AGGREGATED AFFECTED VERSIONS

FIG. 3

SOFTWARE PACKAGE UPDATE HANDLING

BACKGROUND

Software packages or software suites installed onto systems periodically require updating for various reasons. Some software within the software package or suite can rely on other software, creating dependencies among individual software elements. Users often incorporate open-source software or software packages into existing systems. Similar to existing dependencies among software elements, these open-source software or software packages can depend on properly functioning software or software packages already established on the system. Upgrading certain software elements within a software package often necessitates update or upgrade propagation among software dependent upon the upgraded software element to prevent incompatibility issues.

SUMMARY

According to an embodiment described herein, a computer-implemented method for software package update handling is provided. The method installs an initial set of software packages in a virtual environment. A package dependency graph is generated representing independent software packages and dependent software packages of the initial set of software packages. One or more software packages are updated with one or more updated software packages to generate a subsequent set of software packages. A compatibility check is performed on the subsequent set of software packages. The method generates an update prerequisite package based on the compatibility check.

According to an embodiment described herein, a system for software package update handling is provided. The system includes one or more processors and a computer-readable storage medium, coupled to the one or more processors, storing program instructions that, when executed by the one or more processors, cause the one or more processors to perform operations. The operations install an initial set of software packages in a virtual environment. A package dependency graph is generated representing independent software packages and dependent software packages of the initial set of software packages. One or more software packages are updated with one or more updated software packages to generate a subsequent set of software packages. A compatibility check is performed on the subsequent set of software packages. The operations generate an update prerequisite package based on the compatibility check.

According to an embodiment described herein, a computer program product for software package update handling is provided. The computer program product includes a computer-readable storage medium having program instructions embodied therewith, the program instructions being executable by one or more processors to cause the one or more processors to install an initial set of software packages in a virtual environment. A package dependency graph is generated representing independent software packages and dependent software packages of the initial set of software packages. One or more software packages are updated with one or more updated software packages to generate a subsequent set of software packages. A compatibility check is performed on the subsequent set of software packages. The computer program product generates an update prerequisite package based on the compatibility check.

BRIEF DESCRIPTION OF THE DRAWINGS

FIG. 2 depicts a flow diagram of a computer-implemented method for software package update handling, according to at least one embodiment.

FIG. 3 depicts a flow diagram of a computer-implemented method for software package update handling, according to at least one embodiment.

DETAILED DESCRIPTION

Figure 1:
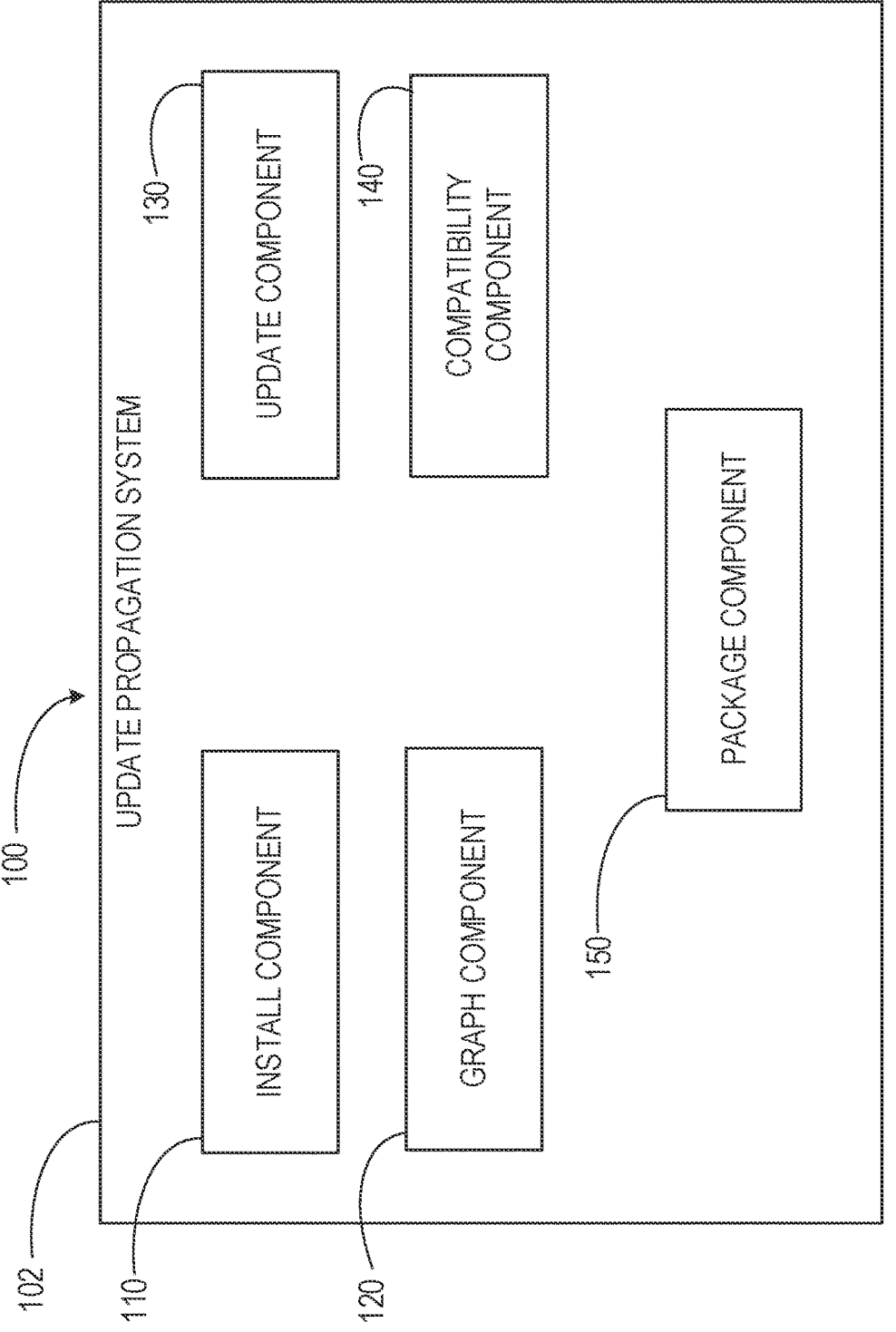
FIG. 1 depicts a block diagram of a computing environment for implementing concepts and computer-based methods, according to at least one embodiment.

The present disclosure relates generally to methods for software package update handling. More particularly, but not exclusively, embodiments of the present disclosure relate to a computer-implemented method for propagating software package updates using syntactic and semantic analysis. The present disclosure relates further to a related system for software package update handling, and a computer program product for operating such a system.

Software packages or software suites installed onto systems periodically require updating for various reasons, such as newly identified vulnerabilities, changed functionality, or bug fixes. While some updates to software can be done in a piecemeal or independent manner, some software updates require updating additional software.

Installing a given software package or suite includes installing dependent software packages. Dependent software packages within the software package or suite rely on other software. The dependency indicates that the dependent software element or software package relies on another software element for proper function. Upgrading certain software elements within a software package often necessitates update or upgrade propagation from independent or dependee software to a dependent or depender software package. Dependent software which relies on safe, secure, and functioning software elements may require updating propagation to avoid incompatibility issues with software on which it depends.

Package dependency among software elements can be determined using package dependency graphing. In package dependency graphs, there are two types of packages or software, dependee and depender. Some dependee software elements or packages may be independent software which does not rely on another software package. Some dependee software may indicate simply that another software package or element relies on the dependee software, while the dependee software may itself rely on other software. Depender software relies on another software or software element. Depender software may rely on other depender software or on dependee software. As such, in an update or software installation scenario, a dependee or dependent software package may be a prerequisite to be installed and used by a depender. Further, installing a software package includes installing all of its dependent packages, which may result in large dependency graphs. Changes found in a dependee package often necessitate propagation to depender packages to prevent incompatibility issues. Update propagation can result in lead time issues and unintended incompatibility issues based on a size of the dependency graph to be managed.

Embodiments of the present disclosure enable upgrade and update propagation among software packages. The present disclosure enables update propagation of software packages using compatibility checking. Some embodiments of the present disclosure enable software package update propagation using dependency graphs. The present disclosure identifies changes within a software package, including vulnerabilities, bug fixes, and enhancements in underlying dependent software packages. The present disclosure provides compatibility checking. Some embodiments of the present disclosure use syntactic and semantic analysis for compatibility checking. The present disclosure enables automated package updating and creation of update prerequisite packages based on identified changes and compatibility checking of software packages. Embodiments of the present disclosure decrease delay in updating software packages, reducing risk of vulnerabilities and issues associated with bug fixes or incompatible enhancements. Embodiments of the present disclosure provide continual protection and updating for production environments, hardening system security. Embodiments of the present disclosure provide an automated updating methodology which is integrated into development, security, and operations pipelines.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an update propagation system 102. The update propagation system 102 may comprise an install component 110, a graph component 120, an update component 130, a compatibility component 140, and a package component 150. The install component 110 installs sets of software packages in virtual environments. The graph component 120 generates software propagation graphs for sets of software packages in a virtual environment. The update component 130 updates individual software packages within an initial set of software packages in a virtual environment to generate subsequent sets of software packages. The compatibility component 140 performs compatibility checking on subsequent sets of software packages in a virtual environment. The package component 150 generates update prerequisite packages based on compatibility checks and subsequent sets of software packages in a virtual environment. Although described with distinct components, it should be understood that, in at least some embodiments, components may be combined or divided, and/or additional components may be added without departing from the scope of the present disclosure.

Referring now to FIG. 2, a flow diagram of a computer-implemented method 200 is shown. The computer-implemented method 200 is a method for software package update handling. In some embodiments, the computer-implemented method 200 may be performed by one or more components of the computing environment 100, as described in more detail below.

At operation 210, the install component 110 installs an initial set of software packages. The initial set of software packages may be installed in a virtual environment. In some embodiments, the virtual environment is a clone of a real-time environment in which all or at least a portion of the initial set of software packages are installed. In some instances, the initial set of software packages are installed on the virtual environment in an initial state. The initial state may be an initial version of a software element. In some instances, the real-time environment contains software elements of the set of software packages in varying version states. The varying version states may represent a subsequent version or version iteration of a given software element or program.

In some embodiments, the initial set of software packages are required software packages from a prerequisite list. The prerequisite list may be a list such as, requirement.txt or package.json. The prerequisite list may be a current operating list of packages on the real-time environment. In some instances, the prerequisite list is an initial list of software packages in an initial version. The initial version may be a set of software packages in an initial state as originally installed on the real-time environment.

The install component 110 may install the initial set of software packages in response to a user initiation of an update process, an automated initiation of an update or upgrade process, an automated initiation of a vulnerability scan, compatibility analysis, or other suitable automated process. Once initiated, the install component 110 may identify the initial set of software packages from a prerequisite list on the real-time environment. The install component 110 may then generate a virtual environment as a clone environment of the real-time environment. The install component 110 may identify or access a preestablished virtual environment serving as a clone of the real-time environment. Once a location for the installation has been generated, identified, accessed, or otherwise established, the install component 110 installs the initial set of software packages as identified in the initial prerequisite list.

At operation 220, the graph component 120 generates a package dependency graph. In some embodiments, the package dependency graph represents independent software packages and dependent software packages. The independent (e.g., dependee) and dependent (e.g., depender) software packages may make up the initial set of software packages.

In some embodiments, the graph component 120 generates the package dependency graph by initially generating a forest of package dependency trees. The forest of package dependency trees may be generated using any suitable system or method. For example, the graph component 120 may generate the forest of package dependency trees using an open-source tool, such as pipdeptree. Once the forest of package dependency trees is generated, the graph component 120 may perform one or more tree editing operations on individual trees within the forest of package dependency trees. In some instances, the graph component 120 determines if two dependee packages have a same dependent package, representing a duplicated subtree. The graph component 120 may remove the duplicated subtree and make all dependee nodes point to the same dependent node to represent the removed duplicated subtrees. The graph component 120 may perform these editing operations on each tree of the forest of package dependency trees. The graph component 120 may then traverse all the trees/graphs and merge the trees/graphs into a unified graph if the merged trees/graphs contain the same dependent packages. The graph component 120 may repeat the editing and merging or pruning operations on each tree of the forest of package dependency trees until a single package dependency graph is generated for the initial set of software packages.

At operation 230, the update component 130 updates one or more software packages of the initial set of software packages. In some embodiments, updating the one or more software packages generates a subsequent set of software packages. The update component 130 may update the one or more software packages by identifying the one or more software packages as having a change indicating a different version, an update, or an upgrade in the real-time environment or in a change database. In response to identifying the one or more software packages having a change, the update component 130 updates or changes a version of the one or more software packages in the initial set of software packages to a version found in the real-time environment or change database. The update component 130 may update the one or more software packages by downloading and installing the changed version of the one or more software packages into the virtual environment. In some instances, updating the one or more software packages changes the packages to a later fixed version, such as a version closest to an installed changed version. Installation of the updated one or more software packages may represent or generate the subsequent set of software packages.

At operation 240, the compatibility component 140 performs a compatibility check on the subsequent set of software packages. The compatibility component 140 may perform the compatibility check on the subsequent set of software packages using syntactic and semantic means. In some embodiments, the compatibility component 140 performs the compatibility check using a call-graph and an artificial intelligence (AI) based compatibility check. In such embodiments, the compatibility component 140 checks compatibility of the subsequent set of software packages through syntactic changes, such as API changes, API name changes, input changes, and output changes. The compatibility component 140 also checks compatibility of the subsequent set of software packages through semantic or functionality changes.

In some embodiments, the compatibility component 140 performs a syntactic compatibility check using a call-graph. The compatibility component 140 may determine a call graph compatibility of each updated software package of the subsequent set of software packages. The compatibility may be determined with one or more dependent software packages depending on the updated software package.

In some embodiments, after updating or upgrading the packages to generate the subsequent set of software packages, the compatibility component 140 determines whether the new packages are compatible with dependees and dependers on dependency graphs associated with the changed software packages of the subsequent set of software packages. The compatibility component 140 may examine or parse source code to extract call-graphs from depender packages to the changed packages and to the depender packages. The compatibility component 140 may determine whether any link on the call graph is broken. For example, the compatibility component 140 may check between the changed packages, dependee packages, and depender packages to identify any unmatched function names, unmatched function input, unmatched function output, combinations thereof, or any other broken links. Where the call-graph of the changed packages, dependee packages, and depender packages has no broken links, the compatibility component 140 may determine the subsequent set of software packages are syntactically compatible.

In some embodiments, the compatibility component 140 performs the compatibility check by determining a functionality compatibility of each updated software package of the subsequent set of software packages. The functionality compatibility may be determined with one or more dependent software packages depending on the updated software package. The functionality compatibility may be determined by the compatibility component 140 using a trained machine learning model.

In some embodiments, after updating or upgrading the packages to generate the subsequent set of software packages, the compatibility component 140 checks whether an updated function in the fixed or changed version of the software package contains new functionalities which may break the application logic used in depender packages of that changed software package. In such embodiments, the compatibility component 140 may obtain source code for vulnerable and fixed versions of the changed software package versions. The compatibility component 140 may also obtain corresponding functionality compatibility output for the versions of the changed software packages. In some embodiments, the compatibility component 140 trains AI-based functionality compatibility checking by using vulnerable source code ($c_{i1}$) and fixed source code ($c_{i2}$) and corresponding functionality compatibility output ($o_i$: $\{0,1\}$) for i=0 to N. The compatibility component 140 may generate numerical representations ($v_{i1}$, $v_{i2}$) for ($c_{i1}$, $c_{i2}$) using code2vec. The compatibility component 140 may then concatenate $v_{i1}$ and $v_{i2}$ to generate a feature vector $f_i$. The compatibility component 140 may add $f_i$ to x and $o_i$ to y. Using <x,y>, the compatibility component 140 may train a machine learning model M. The machine learning model may be trained using support vector machine (SVM), Logistic Regression, Deep Neural Networks, or any other suitable machine learning method or technique. In classification, the compatibility component 140 may generate numerical representations ($v_{i1}$, $v_{i2}$) for ($c_{i1}$, $c_{i2}$) for the vulnerable and fixed versions of the changed software packages ($c_{i1}$) and ($c_{i2}$). The compatibility component 140 may concatenate $v_{i1}$ and $v_{i2}$ to generate a feature vector $f_i$ and run $f_i$ through the trained model M to return an output (0 or 1).

In some embodiments, once a machine learning model has been learned by the compatibility component 140, the compatibility component 140 may employ active learning for the functionality compatibility model. The compatibility component 140 may use active learning to train compatibility models for accurate functionality compatibility checking.

In such embodiments, the compatibility component 140 may use, as inputs, labeled sets (e.g., labeled set D) of source code in vulnerable ($c_1$) and fixed ($c_2$) versions and a compatibility label (o). The compatibility component 140 may train a classifier (f) based on training data (D). In some instances, while an unlabeled set is not empty or a subject matter expert may further validate, the compatibility component 140 may select an unlabeled set $D_i$ with vulnerable and fixed function source code ($c_{i1}$, $c_{i2}$). The compatibility component 140 may predict functionality compatibility for ($c_{i1}$, $c_{i2}$), output as $o_i$. The compatibility component 140 may use feedback from the subject matter expert to validate that $o_i$ is correct. The compatibility component 140 may update training data to $D_{new}$ with ($c_{i1}$, $c_{i2}$) based on the validation. The compatibility component 140 may also update the label if necessary. The compatibility component 140 may then retrain a classifier $f_{new}$ using $D_{new}$.

In some embodiments, the update component 130 repeatedly performs the updating of one or more software packages of the initial set of software packages. For each update, the compatibility component 140 may perform a compatibility check on the subsequent set of software packages. The update component 130 and the compatibility component 140 may cooperate to iteratively update the software packages, based on repeated compatibility checks, until an upgrade stop condition occurs. The upgrade stop condition may occur where no more software packages are subject to vulnerabilities. The upgrade stop condition may occur where no compatibility issues exist between dependee and depender packages. In some instances, the upgrade stop condition occurs where the software packages within a subsequent set of software packages are not subject to known vulnerabilities or incompatibilities.

At operation 250, the package component 150 generates an update prerequisite package. The update prerequisite package may be based on the compatibility check or results of the compatibility check. In some embodiments, the package component 150 generates the update prerequisite package as a refined package, distinct from the initial set of software packages, with software package versions which are not subject to known vulnerabilities or known incompatibilities with dependee and dependent software packages.

FIG. 3 shows a flow diagram of an embodiment of a computer-implemented method 300 for software package update handling. The method 300 may be performed by or within the computing environment 100. In some embodiments, the method 300 comprises or incorporates one or more operations of the method 200. In some instances, operations of the method 300 may be incorporated as part of or sub-operations of the method 200, such as operation 230.

In operation 310, the update component 130 identifies one or more changed packages of an initial set of software packages. The update component 130 may identify the one or more changed packages among all of the installed packages in a virtual environment. In some instances, the update component 130 may identify the one or more changed packages as packages which have been upgraded on a real-time environment for which the virtual environment is a clone. The changed packages may be updated packages, upgraded packages, packages having identified vulnerabilities, packages having identified bugs, new packages, packages having known improvements, combinations thereof, or any other suitable change.

The update component 130 identifies the one or more changed packages on a change database. The update component 130 may identify the one or more changed packages on the change database by comparing software naming conventions, version naming, change date information, combinations thereof, or any other suitable method.

In operation 320, the update component 130 generates a list of vulnerable packages of the initial set of software packages. The list of vulnerable packages includes a list of affected versions for at least one software package. In some instances, the update component 130 generates the list of vulnerable packages by identifying and accessing a vulnerability database. For example, the update component 130 may use safety check functionality on a user specified vulnerability database. The update component 130 may generate the list of vulnerable packages as a subset of packages of the initial set of software packages having affected versions within the vulnerability database.

In operation 330, the update component 130 aggregates affected versions for the at least one software package. Upon identifying the vulnerability database and generating the list of affected versions within the vulnerability database, the update component 130 may prune the list of vulnerable packages. In some embodiments, the update component 130 prunes the list of vulnerable packages by aggregating results within the list of vulnerable packages. The list may be pruned by aggregating results for a same package having multiple vulnerable versions. The multiple vulnerable versions may share the same vulnerabilities or have differing vulnerabilities. The update component 130 may aggregate the results by eliminating iterations or software packages with known or identified vulnerabilities. For example, where a cryptography software package is installed as version 3.1, the update component 130 may identify, within the vulnerability database, that versions 3.2 and 3.3.1 are also vulnerable. In the example, the update component 130 may then aggregate the list of vulnerable packages for the cryptography package to indicate that version 3.3.2 is a version in which the vulnerability or known vulnerabilities have been corrected.

In operation 340, the update component 130 upgrades the one or more changed packages to a package version based on the change database, the list of vulnerable packages, and the aggregated affected versions. The update component 130 may upgrade the one or more changed packages by selecting a package from the change database, within the aggregated list of vulnerable packages, that is not currently subject to known vulnerabilities. In some instances, the update component 130 upgrades the one or more changed packages to a current package version on the change database. The one or more changed package may also be a package version, other than the current package version, on the change database which is not subject to known vulnerabilities.

Figure 4:
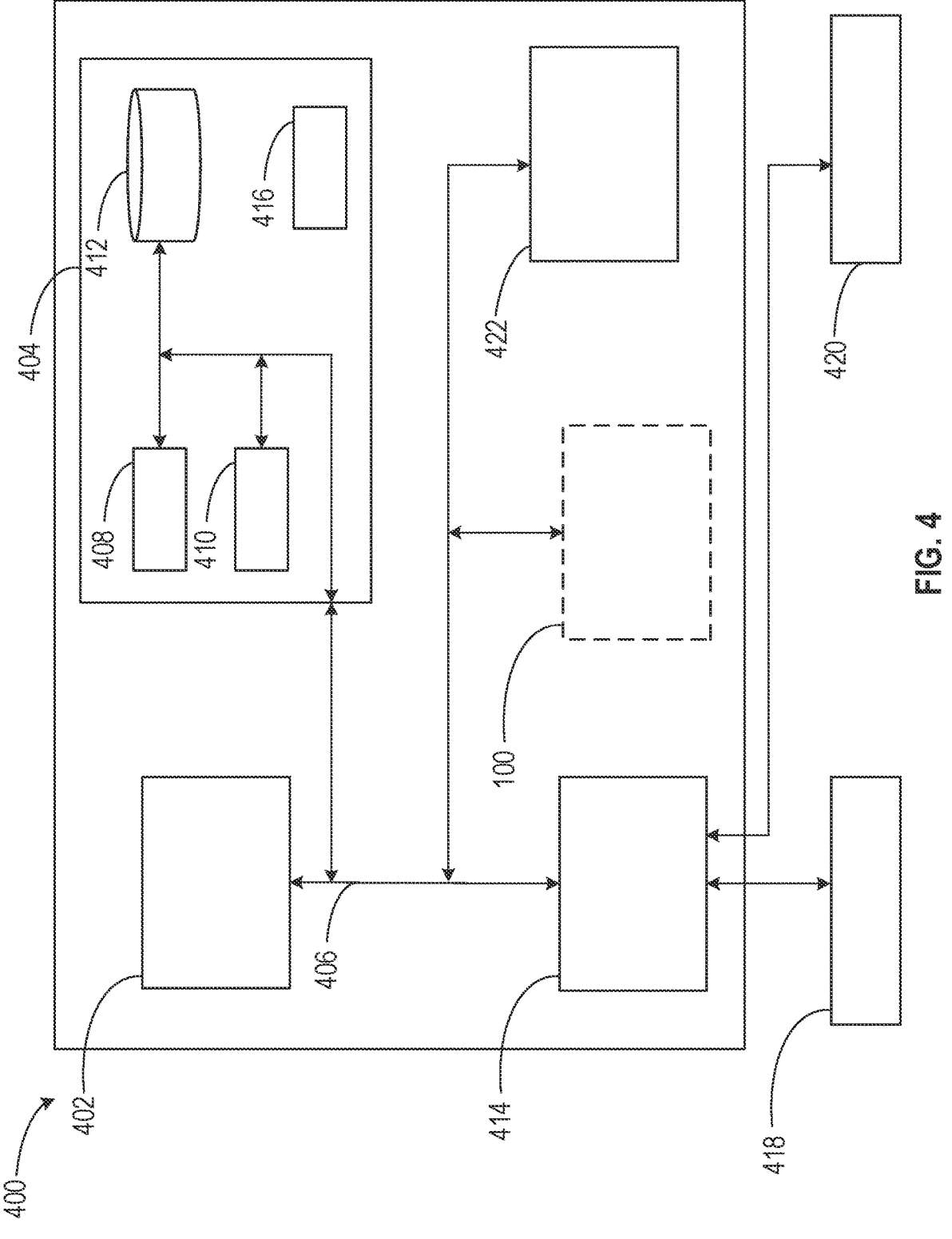
FIG. 4 depicts a block diagram of a computing system for software package update handling, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for software package update handling.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, micropro-cessor-based systems, set-top boxes, programmable con-sumer electronics, network PCs, minicomputer systems, mainframe computer systems, and distributed cloud com-puting environments that include any of the above systems or devices, and the like. Computer system/server 400 may be described in the general context of computer system-execut-able instructions, such as program modules, being executed by a computer system 400. Generally, program modules may include routines, programs, objects, components, logic, data structures, and so on that perform particular tasks or imple-ment particular abstract data types. Computer system/server 400 may be practiced in distributed cloud computing envi-ronments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the func-tions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the install component 110, the graph com-ponent 120, the update component 130, the compatibility component 140, and the package component 150, which are illustrated in FIG. 1. Each of the operating systems, one or more application programs, other program modules, and program data or some combination thereof, may include an implementation of a networking environment. Program modules 416 generally carry out the functions and/or meth-odologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such commu-nication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, imple-mentation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infra-structure. The applications are accessible from various client devices through a thin client interface such as a web browser (e.g., web-based e-mail). The consumer does not manage or control the underlying cloud infrastructure including net-work, servers, operating systems, storage, or even individual application capabilities, with the possible exception of lim-ited user-specific application configuration settings. In PaaS, the capability provided to the consumer is to deploy onto the cloud infrastructure consumer-created or acquired applica-tions created using programming languages and tools sup-ported by the provider. The consumer does not manage or control the underlying cloud infrastructure including net-works, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
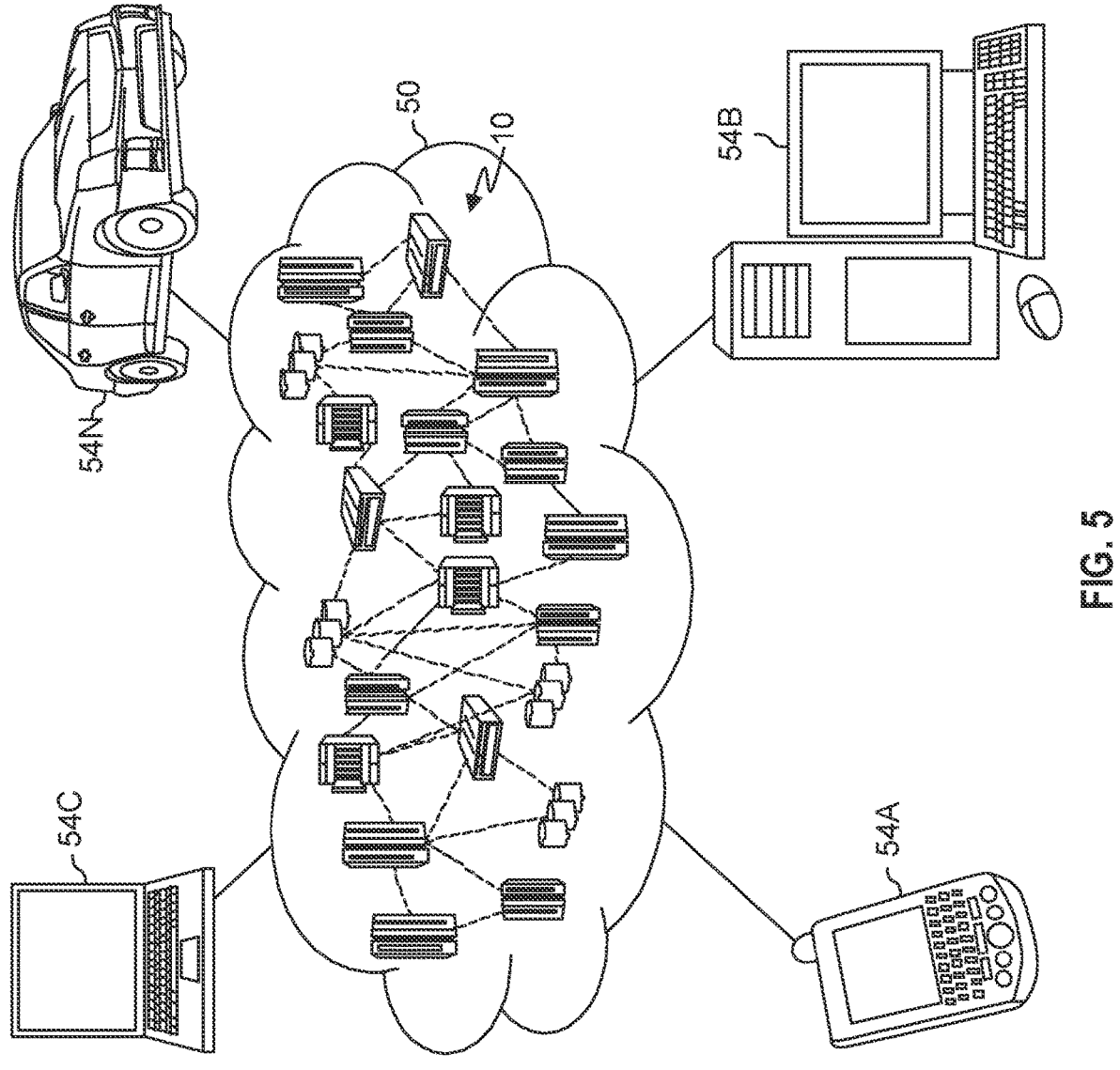
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
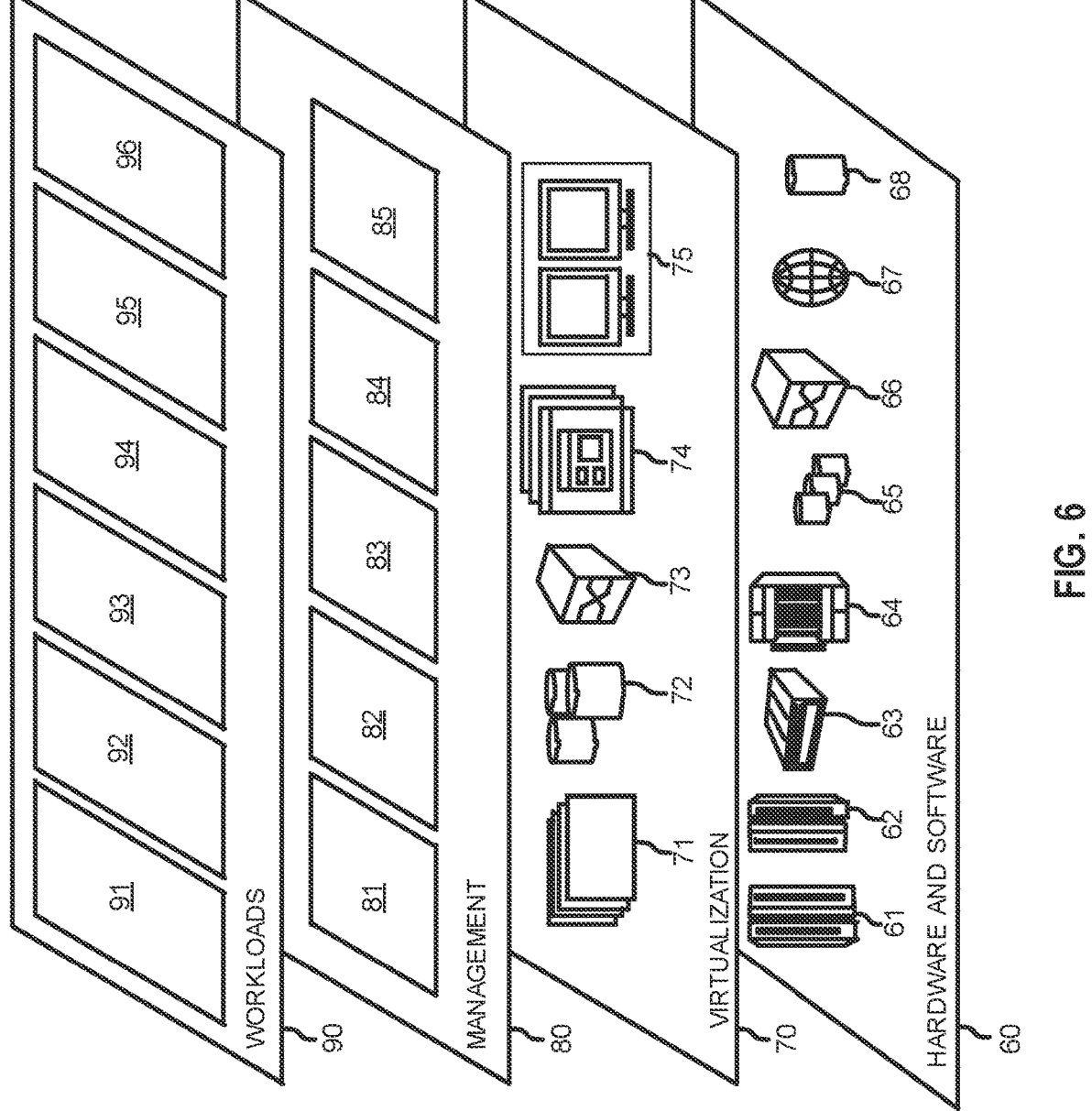
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and update propagation processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating a package dependency graph representing independent software packages and dependent software packages of an initial set of software packages installed in a virtual environment;
identifying a dependent software package that is dependent on one of the initial set of software packages, based on the package dependency graph;
iteratively:
updating one or more software packages of the initial set of software packages with one or more updated software packages to generate a subsequent set of software packages comprising the dependent software package;
performing a compatibility check on the subsequent set of software packages; and
installing the subsequent set of software packages based on the compatibility check until an upgrade stop condition occurs wherein the software packages within a subsequent set of software packages are not subject to known vulnerabilities and incompatibilities,
wherein generating the package dependency graph further comprises:
generating a forest of package dependency trees;
editing individual dependency trees within the forest to remove duplicate subtrees when dependee packages have a same dependent package; and
merging the dependency trees into a unified graph, wherein the merged dependency trees contain the same dependent packages.

2. The method of claim 1, wherein the virtual environment is a clone of a real-time environment.

3. The method of claim 1, wherein the updating the one or more software packages further comprises:
identifying one or more changed packages on the initial set of software packages within a change database; and
upgrading the one or more changed packages to a current package version on the change database.

4. The method of claim 3, wherein the identifying the one or more changed packages further comprises:
generating a list of vulnerable packages of the initial set of software packages, the list of vulnerable packages including a list of affected versions for at least one software package; and
aggregating the affected versions for the at least one software packages.

5. The method of claim 1, wherein the performing the compatibility check further comprises:
determining a call graph compatibility of each updated software package of the subsequent set of software packages with one or more dependent software packages depending on the updated software package.

6. The method of claim 1, wherein the performing the compatibility check further comprises:
determining a functionality compatibility of each updated software package of the subsequent set of software packages with one or more dependent software packages depending on the updated software package.

7. A system, comprising:
one or more processors; and
a computer-readable storage medium, coupled to the one or more processors, storing program instructions that, when executed by the one or more processors, cause the one or more processors to perform operations comprising:
generating a package dependency graph representing independent software packages and dependent software packages of an initial set of software packages installed in a virtual environment;
identifying a dependent software package that is dependent on one of the initial set of software packages, based on the package dependency graph;
iteratively:
updating one or more software packages of the initial set of software packages with one or more updated software packages to generate a subsequent set of software packages comprising the dependent software package;
performing a compatibility check on the subsequent set of software packages; and installing the subsequent set of software packages based on the compatibility check until an upgrade stop condition occurs wherein the software packages within a subsequent set of software packages are not subject to known vulnerabilities and incompatibilities, wherein generating the package dependency graph further comprises:

generating a forest of package dependency trees;

editing individual dependency trees within the forest to remove duplicate subtrees when dependee packages have a same dependent package; and merging the dependency trees into a unified graph, wherein the merged dependency trees contain the same dependent packages.

8. The system of claim 7, wherein the virtual environment is a clone of a real-time environment.

9. The system of claim 7, wherein the updating the one or more software packages further comprises:

identifying one or more changed packages on the initial set of software packages within a change database; and upgrading the one or more changed packages to a current package version on the change database.

10. The system of claim 9, wherein the identifying the one or more changed packages further comprises:

generating a list of vulnerable packages of the initial set of software packages, the list of vulnerable packages including a list of affected versions for at least one software package; and aggregating the affected versions for the at least one software packages.

11. The system of claim 7, wherein the performing the compatibility check further comprises:

determining a call graph compatibility of each updated software package of the subsequent set of software packages with one or more dependent software packages depending on the updated software package.

12. The system of claim 7, wherein the performing the compatibility check further comprises:

determining a functionality compatibility of each updated software package of the subsequent set of software packages with one or more dependent software packages depending on the updated software package.

13. A computer program product comprising a computer readable storage medium having program instructions embodied therewith, the program instructions being executable by one or more processors to cause the one or more processors to perform operations comprising:

generating a package dependency graph representing independent software packages and dependent software packages of an initial set of software packages installed in a virtual environment;

identifying a dependent software package that is dependent on one of the initial set of software packages, based on the package dependency graph;

iteratively:

updating one or more software packages of the initial set of software packages with one or more updated software packages to generate a subsequent set of software packages comprising the dependent software package;

performing a compatibility check on the subsequent set of software packages; and installing the subsequent set of software packages based on the compatibility check until an upgrade stop condition occurs wherein the software packages within a subsequent set of software packages are not subject to known vulnerabilities and incompatibilities, where in generating the package dependency graph further comprises:

generating a forest of package dependency trees;

editing individual dependency trees within the forest to remove duplicate subtrees when dependee packages have a same dependent package; and merging the dependency trees into a unified graph, wherein the merged dependency trees contain the same dependent packages.

14. The computer program product of claim 13, wherein the updating the one or more software packages further comprises:

identifying one or more changed packages on the initial set of software packages within a change database; and upgrading the one or more changed packages to a current package version on the change database.

15. The computer program product of claim 14, wherein the identifying the one or more changed packages further comprises:

generating a list of vulnerable packages of the initial set of software packages, the list of vulnerable packages including a list of affected versions for at least one software package; and aggregating the affected versions for the at least one software packages.

16. The computer program product of claim 13, wherein the performing the compatibility check further comprises:

determining a call graph compatibility of each updated software package of the subsequent set of software packages with one or more dependent software packages depending on the updated software package.

17. The computer program product of claim 13, wherein the performing the compatibility check further comprises:

determining a functionality compatibility of each updated software package of the subsequent set of software packages with one or more dependent software packages depending on the updated software package.

* * * * *